(12) United States Patent
Anderson et al.

(10) Patent No.: US 12,556,553 B2
(45) Date of Patent: Feb. 17, 2026

(54) NETWORK SECURITY AND RELATED APPARATUSES, METHODS, AND SECURITY SYSTEMS

(71) Applicant: Battelle Energy Alliance, LLC, Idaho Falls, ID (US)

(72) Inventors: Matthew W. Anderson, Idaho Falls, ID (US); Brandon S. Biggs, Idaho Falls, ID (US); Matthew R. Sgambati, Rigby, ID (US); Kyle S. Staples, Ammon, ID (US); Jared C. Wadsworth, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 194 days.

(21) Appl. No.: 17/663,883

(22) Filed: May 18, 2022

(65) Prior Publication Data
US 2023/0379345 A1    Nov. 23, 2023

(51) Int. Cl.
*H04L 9/40* (2022.01)

(52) U.S. Cl.
CPC ...... *H04L 63/1425* (2013.01); *H04L 63/1441* (2013.01)

(58) Field of Classification Search
CPC .......... H04L 63/1425; H04L 63/1441; H04L 63/1416; H04L 63/1408; H04L 43/04; H04L 63/14; H04L 41/16
See application file for complete search history.

(56) References Cited

U.S. PATENT DOCUMENTS

| 9,032,525 B2 | 5/2015 | Sallam |
| 9,721,099 B2 | 8/2017 | Sinclair et al. |
| 10,021,128 B2 | 7/2018 | McDougal |
| 10,505,956 B1 | 12/2019 | Pidathala et al. |

(Continued)

FOREIGN PATENT DOCUMENTS

WO    2020/159439 A1    8/2020

OTHER PUBLICATIONS

An, J., et al., "Variational Autoencoder Based Anomaly Detection Using Reconstruction Probability," Special Lecture on IE, Dec. 27, 2015, pp. 18.

(Continued)

*Primary Examiner* — Ali S Abyaneh
(74) *Attorney, Agent, or Firm* — TraskBritt

(57) ABSTRACT

Network security and related apparatuses, methods, and security systems are disclosed. An apparatus includes a variational autoencoder trained to reconstruct a benign packet flow representation of a benign packet flow corresponding to a benign stream of packets. The processing circuitry is configured to apply a packet flow representation of a packet flow corresponding to a received stream of packets to the variational autoencoder to generate a reconstructed packet flow representation. The packet flow representation includes one or more of a determined transfer entropy corresponding to the received stream of packets, flow derived metadata, or a Granger causality of the packet flow. The processing circuitry is also configured to determine a reconstruction loss of the reconstructed packet flow representation and determine whether the received stream of packets is anomalous responsive to the determined reconstruction loss.

20 Claims, 5 Drawing Sheets

(56) References Cited

U.S. PATENT DOCUMENTS

| | | | |
|---|---|---|---|
| 10,523,609 | B1 | 12/2019 | Subramanian |
| 10,581,898 | B1 | 3/2020 | Singh |
| 10,609,050 | B2 | 3/2020 | Caspi et al. |
| 10,685,293 | B1 | 6/2020 | Heimann et al. |
| 10,848,519 | B2 | 11/2020 | Howard et al. |
| 10,880,328 | B2 | 12/2020 | Farhady et al. |
| 11,227,162 | B1* | 1/2022 | Lu .................. G06V 20/52 |
| 11,537,902 | B1* | 12/2022 | Aydore .............. G06N 3/047 |
| 11,556,644 | B1 | 1/2023 | Zeppenfeld et al. |
| 11,657,269 | B2* | 5/2023 | Che .................. G06F 17/18 706/25 |
| 2007/0112824 | A1 | 5/2007 | Lock et al. |
| 2014/0095425 | A1* | 4/2014 | Sipple ................ G06N 5/02 706/52 |
| 2018/0103302 | A1* | 4/2018 | Bell ................. G06N 20/20 |
| 2019/0044964 | A1 | 2/2019 | Chari et al. |
| 2019/0132334 | A1 | 5/2019 | Johns et al. |
| 2019/0166144 | A1 | 5/2019 | Mirsky et al. |
| 2019/0228312 | A1* | 7/2019 | Andoni ............ G06F 18/2433 |
| 2019/0272375 | A1 | 9/2019 | Chen |
| 2019/0294729 | A1 | 9/2019 | Jiang et al. |
| 2020/0076840 | A1 | 3/2020 | Peinador et al. |
| 2020/0076841 | A1 | 3/2020 | Hajimirsadeghi et al. |
| 2020/0076842 | A1 | 3/2020 | Zhou et al. |
| 2020/0092311 | A1 | 3/2020 | Avrahami et al. |
| 2020/0104498 | A1 | 4/2020 | Smith et al. |
| 2020/0134423 | A1 | 4/2020 | Shinde et al. |
| 2020/0175161 | A1 | 6/2020 | Giaconi |
| 2020/0218806 | A1 | 7/2020 | Cho |
| 2020/0257985 | A1* | 8/2020 | West ................ G06N 3/045 |
| 2020/0274787 | A1 | 8/2020 | Dasgupta et al. |
| 2020/0280573 | A1 | 9/2020 | Johnson et al. |
| 2020/0364338 | A1 | 11/2020 | Ducau et al. |
| 2021/0048993 | A1 | 2/2021 | Burke |
| 2021/0099474 | A1* | 4/2021 | Huang ............... G06N 3/088 |
| 2022/0070195 | A1* | 3/2022 | Sern ................. G06N 3/045 |
| 2022/0172050 | A1* | 6/2022 | Dalli ................ G06N 3/047 |
| 2022/0358214 | A1 | 11/2022 | Anderson et al. |
| 2023/0027149 | A1* | 1/2023 | Kuan ............... H04L 63/1425 |
| 2023/0224277 | A1* | 7/2023 | Tarighat ........... H04L 63/1425 726/15 |
| 2024/0086527 | A1 | 3/2024 | Rosen et al. |

OTHER PUBLICATIONS

Artuso, F., et al., "In Nomine Function: Naming Functions in Stripped Binaries with Neural Networks," Machine Learning, Feb. 4, 2021, pp. 15.

* cited by examiner

NETWORK SECURITY AND RELATED APPARATUSES, METHODS, AND SECURITY SYSTEMS

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

TECHNICAL FIELD

This disclosure relates generally to network security, and more specifically to filtering of streams of packets from a network using a variational autoencoder trained to reconstruct a benign packet flow representation.

BACKGROUND

Midsize to large information technology (IT) organizations may operate hundreds to thousands of systems. Operation of such systems may be expensive and complicated. Cybercrime may cost $10.5 billion or more per year worldwide. Per the Mitre attack matrix, the first step for much cybercrime may begin with reconnaissance and vulnerability scanning. Around 20% of initial access attack vectors may come via network packet-based attacks.

BRIEF SUMMARY

In some embodiments, an apparatus includes a network configured to receive a stream of packets from a network and processing circuitry. The processing circuitry implements a variational autoencoder trained to reconstruct a benign packet flow representation of a benign packet flow corresponding to a benign stream of packets. The processing circuitry is configured to apply a packet flow representation of a packet flow corresponding to the received stream of packets to the variational autoencoder to generate a reconstructed packet flow representation, the packet flow representation comprising one or more of a determined transfer entropy corresponding to the received stream of packets, flow derived metadata, or a Granger causality of the packet flow. The processing circuitry is also configured to determine a reconstruction loss of the reconstructed packet flow representation and determine whether the received stream of packets is anomalous responsive to the determined reconstruction loss.

In some embodiments, a method of operating a security system includes training a variational autoencoder to reconstruct a benign packet flow representation of a benign packet flow corresponding to a benign stream of packets and determining a packet flow representation of a packet flow corresponding to the received stream of packets. The packet flow representation includes one or more of a determined transfer entropy corresponding to the received stream of packets, flow derived metadata, or a Granger causality of the packet flow. The method also includes applying the packet flow representation to the trained variational autoencoder to generate a reconstructed packet flow representation, determining a reconstruction loss of the reconstructed packet flow representation, and determining whether the received stream of packets is anomalous responsive to the reconstructed loss.

In some embodiments, a security system includes a destination device, a network interface configured to receive a stream of packets from a network, and processing circuitry. The processing circuitry is configured to determine whether the received stream of packets is anomalous using a variational autoencoder trained to reconstruct a benign transfer entropy of a benign packet flow corresponding to a benign stream of packets and deliver the received stream of packets to the destination device responsive to a determination that the received stream of packets is not anomalous.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
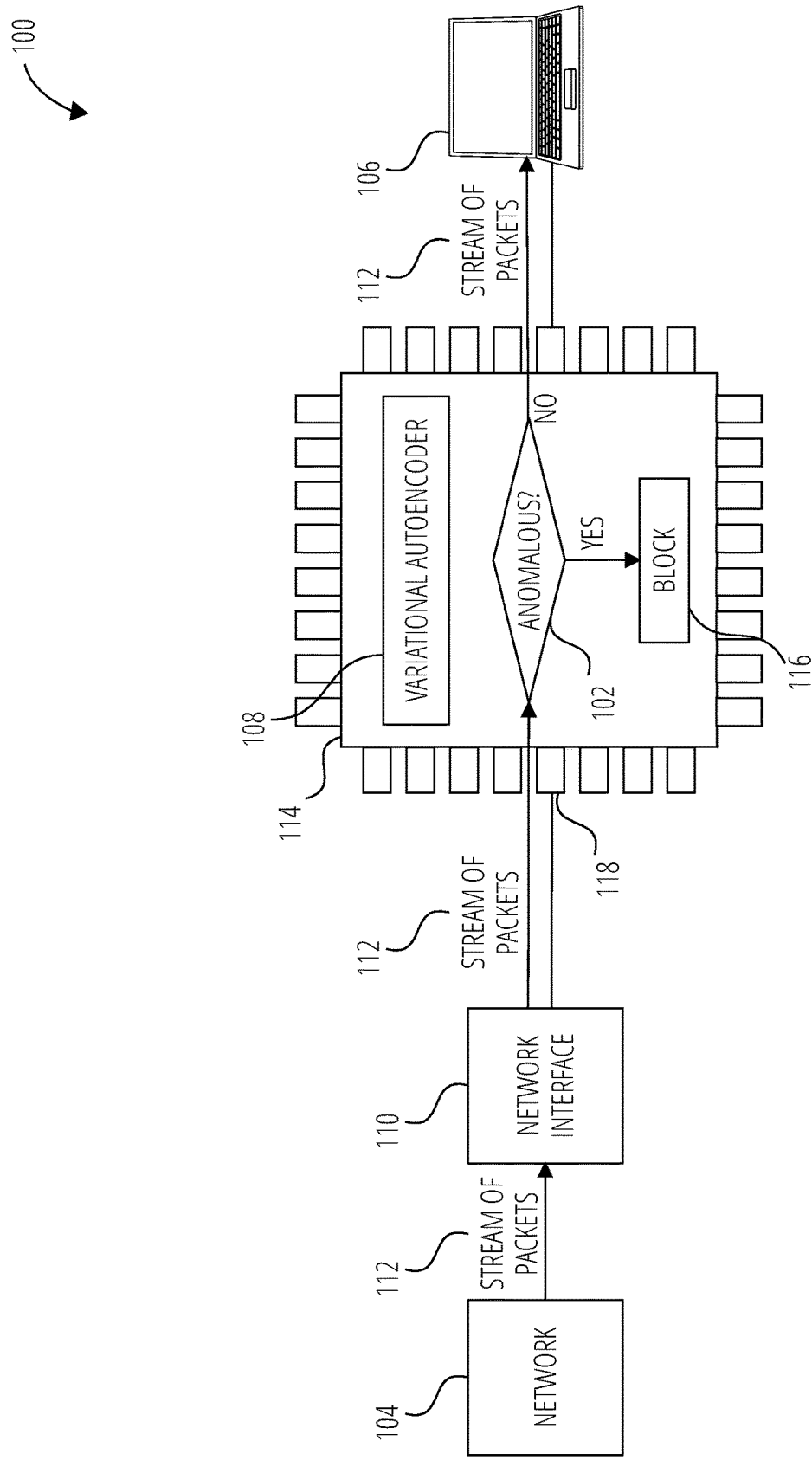
FIG. 1 is a block diagram of a security system, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "benign," when used in conjunction with terms such as "packet flow," "stream of packets," and "transfer entropy," refers to electronic communications that are free of threats (e.g., cyber threats, security threats). For example, a "benign stream of packets" refers to a stream of packets that is free of such threats. Accordingly, a "benign packet flow" is a packet flow corresponding to a benign stream of packets. Also, a "benign transfer entropy" refers to a transfer entropy of a benign packet flow.

Network packet metadata show significant distribution variability with multiple attack signatures ranging from malicious download, brute force attempts, vulnerability scan, and malicious command execution. Machine learning-based classification models for attack detection are difficult to achieve with high classification speed and remain vulnerable to zero-days attacks while conventional rule-based classification systems are not scalable for high accuracy.

A cyberattack surface is expected to increase by an order of magnitude by the year 2025, while network attacks have increased by over fifty times between the years 2015 and 2020. While rule-based network packet security systems have been the gold standard for protections, auxiliary machine learning-based systems, such as embodiments disclosed herein, may be useful to secure future systems. These auxiliary rule-based learning-based systems may bear some similarities to systems currently used for credit card fraud detection but may be adapted for network packet characteristics by incorporating reconstructed probabilities.

In contrast to using binary classifications to detect attacks, disclosed in some embodiments is a mechanism for detecting network packet anomalies that are indicative of a network attack using semi-supervised learning. For example, a reconstruction probability from a variational autoencoder may be used to detect network packet flow anomalies. This approach may detect anomalies in packet flow in a way that is orthogonal and complementary to conventional rule-based firewall approaches. In other words, embodiments disclosed herein may be used in addition to conventional rule-based firewall approaches. In some embodiments, any network packet attack that gets past a firewall rule may still be subject to anomaly detection, allowing detection of zero day attacks.

The variational aspect of the autoencoder according to various embodiments disclosed herein is distinguished from conventional deep autoencoder approaches deployed in credit card fraud detection. Also, variational autoencoders disclosed herein may be adapted to monitor network packet flow characteristics.

FIG. 1 is a block diagram of a security system 100, according to some embodiments. The security system 100 includes a network interface 110 configured to receive a stream of packets 112 from a network 104 and processing circuitry 114 implementing a variational autoencoder 108 trained to reconstruct a benign packet flow representation of a benign packet flow corresponding to a benign stream of packets. An input terminal 118 to the processing circuitry 114 is configured to receive the stream of packets 112 from the network interface 110. Using the variational autoencoder 108 the processing circuitry 114 is configured, at decision 102, to determine whether the received stream of packets 112 is anomalous. The processing circuitry 114 is configured to apply a packet flow representation of a packet flow corresponding to the received stream of packets 112 to the variational autoencoder 108 to generate a reconstructed packet flow representation. The packet flow representation includes one or more of a determined transfer entropy corresponding to the received stream of packets 112, flow derived metadata, or a Granger causality of the packet flow. The processing circuitry is also configured to determine a reconstruction loss of the reconstructed packet flow representation and determine whether the received stream of packets is anomalous responsive to the determined reconstruction loss.

The security system 100 also includes a destination device 106 to which the stream of packets 112 is directed for delivery. Responsive to a determination that the received stream of packets 112 is not anomalous, the processing circuitry 114 is configured to deliver the stream of packets 112 to the destination device 106. If, on the other hand, the processing circuitry 114 determines that the stream of packets 112 is anomalous, the processing circuitry 114 is configured to block 116 the received stream of packets 112 from delivery to the destination device 106 responsive to the determination that the stream of packets 112 is anomalous. A deployment mechanism for performing the decision 102 as to whether the stream of packets 112 is anomalous may be via a man-in-the-middle architecture, as illustrated in FIG. 1.

In some embodiments, the processing circuitry 114 is configured to determine the packet flow representation responsive to the stream of packets 112 itself. By way of non-limiting example, the processing circuitry 114 may monitor the packet flow of the stream of packets 112 and generate the packet flow representation responsive to information captured while monitoring the packet flow. In some embodiments, the processing circuitry 114 is configured to determine the packet flow representation responsive to summarized data (e.g., metadata carried by the stream of packets 112) indicating the packet flow.

In embodiments where the packet flow representation includes a determined transfer entropy corresponding to the stream of packets 112, the variational autoencoder 108 is trained to reconstruct a benign transfer entropy of a benign packet flow corresponding to a benign stream of packets. In some such embodiments, the processing circuitry 114 is configured to determine a transfer entropy of a packet flow corresponding to the received stream of packets 112. In some such embodiments, the processing circuitry 114 is configured to determine the packet flow corresponding to the received stream of packets 112 responsive to the received stream of packets 112 itself. In some embodiments, the processing circuitry 114 is configured to determine the transfer entropy responsive to summarization information indicating the packet flow. In some embodiments, the processing circuitry 114 is configured to determine whether the received stream of packets is anomalous by applying the determined transfer entropy to the variational autoencoder 108 and determining a reconstruction loss of the reconstructed transfer entropy relative to the determined transfer entropy.

Various embodiments disclosed herein may be implemented orthogonally to rule-based network protection systems including firewall rule implementations and exceptions, and may be deployed in conjunction with such technologies. In contrast to such rule-based systems, however, packets may be blocked according to embodiments disclosed herein responsive to a machine learning-based reconstructed probability score (e.g., a reconstruction loss). In some embodiments, a threshold for the reconstructed probability score may be a user-selected and/or a user-tuned parameter (e.g., by a system administrator).

Figure 2:
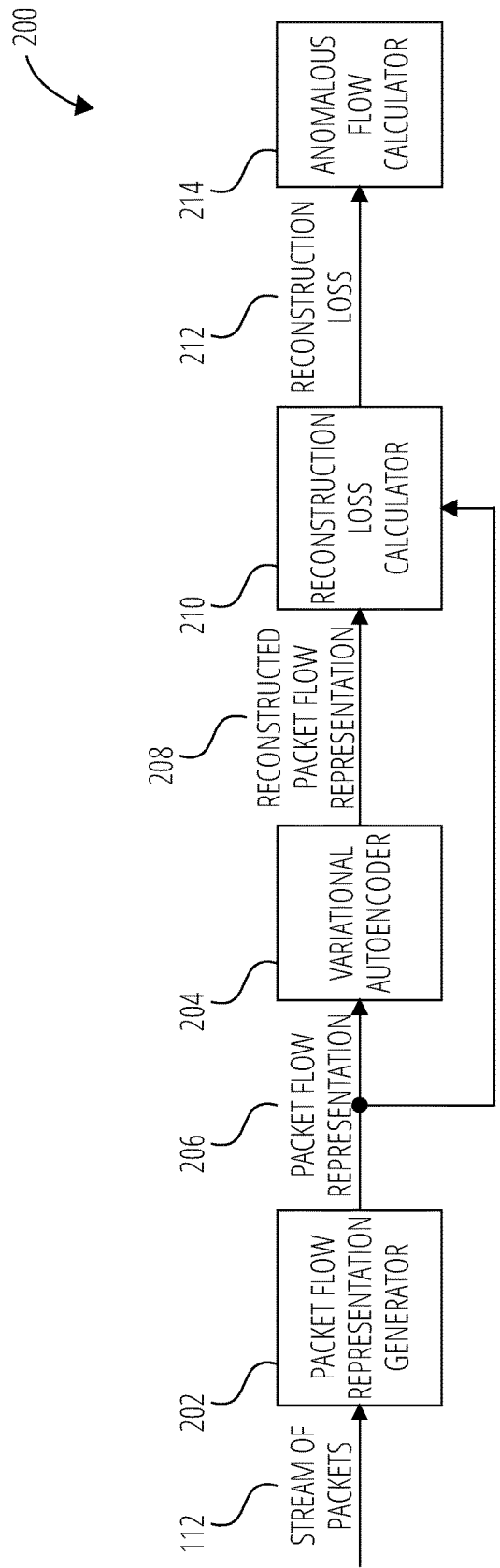
FIG. 2 is a block diagram of a processing circuitry, which is an example processing circuitry of the security system of FIG. 1.

FIG. 2 is a block diagram of a processing circuitry 200, which is an example of the processing circuitry 114 of FIG. 1. The processing circuitry 200 includes a packet flow representation generator 202, a variational autoencoder 204, a reconstruction loss calculator 210, and an anomalous flow calculator 214. The packet flow representation generator 202 is configured to receive the stream of packets 112 and generate a packet flow representation 206 responsive to the stream of packets 112. The packet flow representation generator 202 is configured to deliver the packet flow representation 206 to the variational autoencoder 204.

In some embodiments, the packet flow representation 206 may include a transfer entropy corresponding to the packet flow of the stream of packets 112. In such embodiments, the packet flow representation generator 202 may be configured to determine the transfer entropy responsive to the stream of packets 112. In some embodiments, the packet flow representation 206 may include flow derived metadata, which may be metadata carried by the stream of packets 112, and which may include summarized data indicating the packet flow of the stream of packets 112. In such embodiments, the packet flow representation generator 202 may be configured to extract the flow-derived metadata from the stream of packets 112. In some embodiments, the packet flow representation 206 may include a Granger causality corresponding to the packet flow of the stream of packets 112. A Granger causality corresponding to the packet flow of the stream of packets may include a parameter that may be used to predict the packet flow of the stream of packets 112 based, at least in part, on a statistical causal relationship between the parameter and the packet flow. In such embodiments, the packet flow representation generator 202 may be configured to determine the Granger causality responsive to the stream of packets 112.

The variational autoencoder 204 is configured to receive the packet flow representation 206 and generate a reconstructed packet flow representation 208 responsive to the packet flow representation 206. The variational autoencoder 204 is trained to reconstruct a benign packet flow representation of a benign packet flow corresponding to a benign stream of packets. The variational autoencoder 204 includes an input layer, an encoder layer, a latent layer, a decoder layer, and an output layer. The encoder layer is configured to compress the packet flow representation 206 into a latent space corresponding to the latent layer. The latent space corresponds to a random multivariable normal distribution. The decoder layer is configured to generate the reconstructed packet flow representation 208 responsive to information sampled from the latent space. The variational autoencoder 204 is configured to provide the reconstructed packet flow representation 208 to the reconstruction loss calculator 210.

The reconstruction loss calculator 210 is configured to determine a reconstruction loss 212 responsive to the reconstructed packet flow representation 208 determined by the variational autoencoder 204 and the packet flow representation 206. The reconstruction loss calculator 210 is configured to compare the reconstructed packet flow representation 208 to the packet flow representation 206 to determine the reconstruction loss 212. By way of non-limiting example, the reconstruction loss calculator 210 may subtract the reconstructed packet flow representation 208 from the packet flow representation 206 to generate the reconstruction loss 212. The reconstruction loss calculator 210 is configured to provide the reconstruction loss 212 to the anomalous flow calculator 214.

The anomalous flow calculator 214 is configured to determine whether the stream of packets 112 is anomalous responsive to the reconstruction loss 212. As previously indicated, the variational autoencoder 204 has been trained to reconstruct a benign packet flow representation of a benign packet flow corresponding to a benign stream of packets. As a result, to the extent that a packet flow of the stream of packets 112 deviates from the benign stream of packets used to train the variational autoencoder 204, the reconstructed packet flow representation 208 may deviate from the packet flow representation 206 to a greater extent. A greater deviation of the reconstructed packet flow representation 208 relative to the packet flow representation 206 would result in a greater reconstruction loss 212. Accordingly, in some embodiments, the anomalous flow calculator 214 may be configured to determine that the stream of packets 112 is anomalous (e.g., has an anomalous flow) responsive to a determination that the reconstruction loss 212 is greater than a predetermined threshold value. Also, the anomalous flow calculator 214 may be configured to determine that the stream of packets 112 is not anomalous responsive to a determination that the reconstruction loss 212 is less than or equal to the predetermined threshold value. By way of non-limiting example, the predetermined threshold value may be substantially 0.05. In these examples the stream of packets 112 may be considered an outlier if the reconstruction loss 212 exceeds 0.05, in which case the stream of packets 112 would be classified as anomalous and be sequestered.

Figure 3:
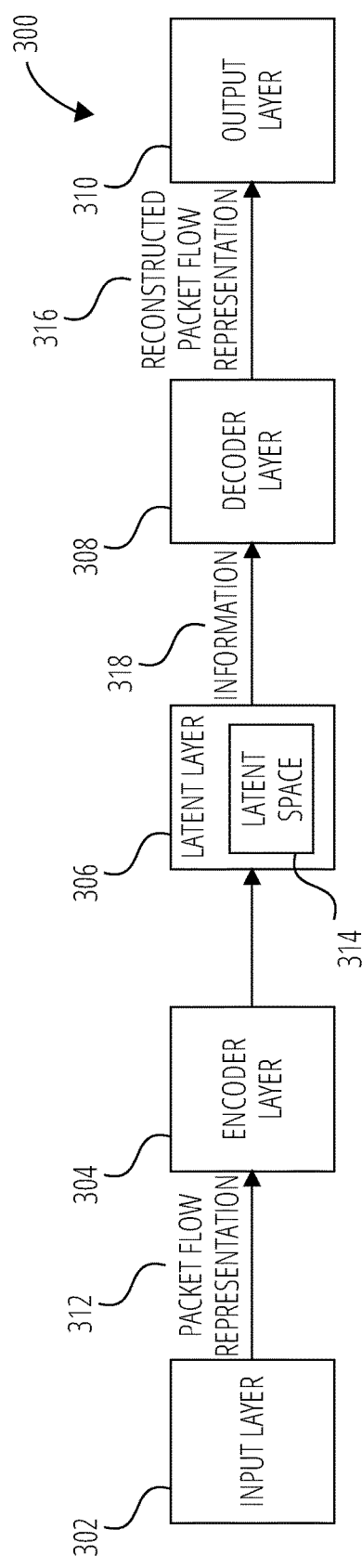
FIG. 3 is a block diagram of a variational autoencoder, which is an example of a variational autoencoder of FIG. 1 and/or of FIG. 2.

FIG. 3 is a block diagram of a variational autoencoder 300, which is an example of the variational autoencoder 108 of FIG. 1 and/or the variational autoencoder 204 of FIG. 2. The variational autoencoder 300 includes an input layer 302, an encoder layer 304, a latent layer 306, a decoder layer 308, and an output layer 310 layer. The encoder layer 304 may be a separate layer based on latent dimension selection. The encoder layer 304 is configured to compress a packet flow representation 312 (e.g., the packet flow representation 206 of FIG. 2) received from the input layer 302 into a latent space 314 corresponding to the latent layer 306. During training of the variational autoencoder 300 a directed acyclic graph hierarchy may have been built. The latent space 314 corresponds to a random multivariable normal distribution. The random multivariable normal distribution may be based on user-specified latent dimensions (e.g., 32 dimensions, without limitation). The decoder layer 308 is configured to generate a reconstructed packet flow representation 316, which may include examples from the latent distribution of the latent space 314, responsive to information 318 sampled from the latent space 314.

Once the variational autoencoder 204 is trained, separate packet metadata (e.g., used as the packet flow representation 206) may be passed to the variational autoencoder 204 to compute a reconstructed probability (e.g., the reconstructed packet flow representation 208) responsive to the multivariate normal probability distribution function at the latent layer 306.

Figure 4:
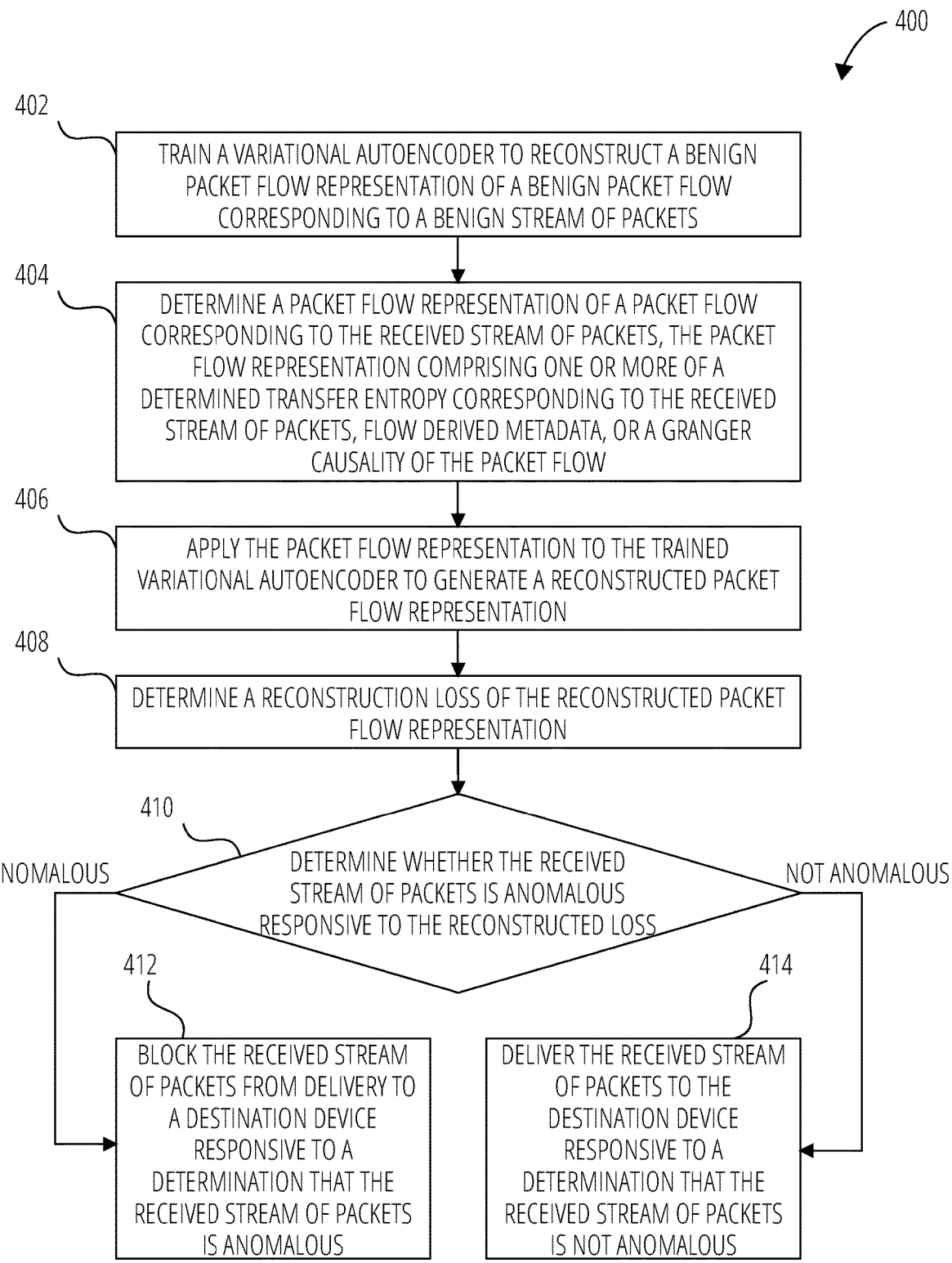
FIG. 4 is a flowchart illustrating a method of operating a security system (e.g., the security system of FIG. 1), according to some embodiments.

FIG. 4 is a flowchart illustrating method 400 of operating a security system (e.g., the security system 100 of FIG. 1), according to some embodiments. At operation 402, method 400 includes training a variational autoencoder to reconstruct a benign packet flow representation of a benign packet flow corresponding to a benign stream of packets. In some embodiments, training the variational autoencoder includes determining the benign packet flow representation of the benign packet flow responsive to the benign stream of packets itself. In some embodiments, training the variational autoencoder includes determining the benign packet flow representation responsive to summarized data indicating the benign packet flow.

At operation 404, method 400 includes determining a packet flow representation of a packet flow corresponding to the received stream of packets. The packet flow representation includes one or more of a determined transfer entropy corresponding to the received stream of packets, flow derived metadata, or a Granger causality of the packet flow. In some embodiments, determining the packet flow representation includes determining the packet flow representation of the packet flow responsive to the stream of packets itself. In some embodiments, determining the packet flow representation includes determining the packet flow representation responsive to summarized data indicating the packet flow.

At operation 406, method 400 includes applying the packet flow representation to the trained variational autoencoder to generate a reconstructed packet flow representation. At operation 408, method 400 includes determining a reconstruction loss of the reconstructed packet flow representation. At decision 410, the method 400 includes determining whether the received stream of packets is anomalous responsive to the reconstructed loss. By way of non-limiting example, the reconstructed loss may be compared to a threshold value to determine whether the received stream of packets is anomalous. At operation 412, method 400 includes blocking the received stream of packets from delivery to a destination device responsive to a determination, at decision 410, that the received stream of packets is anomalous. At operation 414, method 400 includes delivering the received stream of packets to a destination device responsive to a determination, at decision 410, that the received stream of packets is not anomalous.

Figure 5:
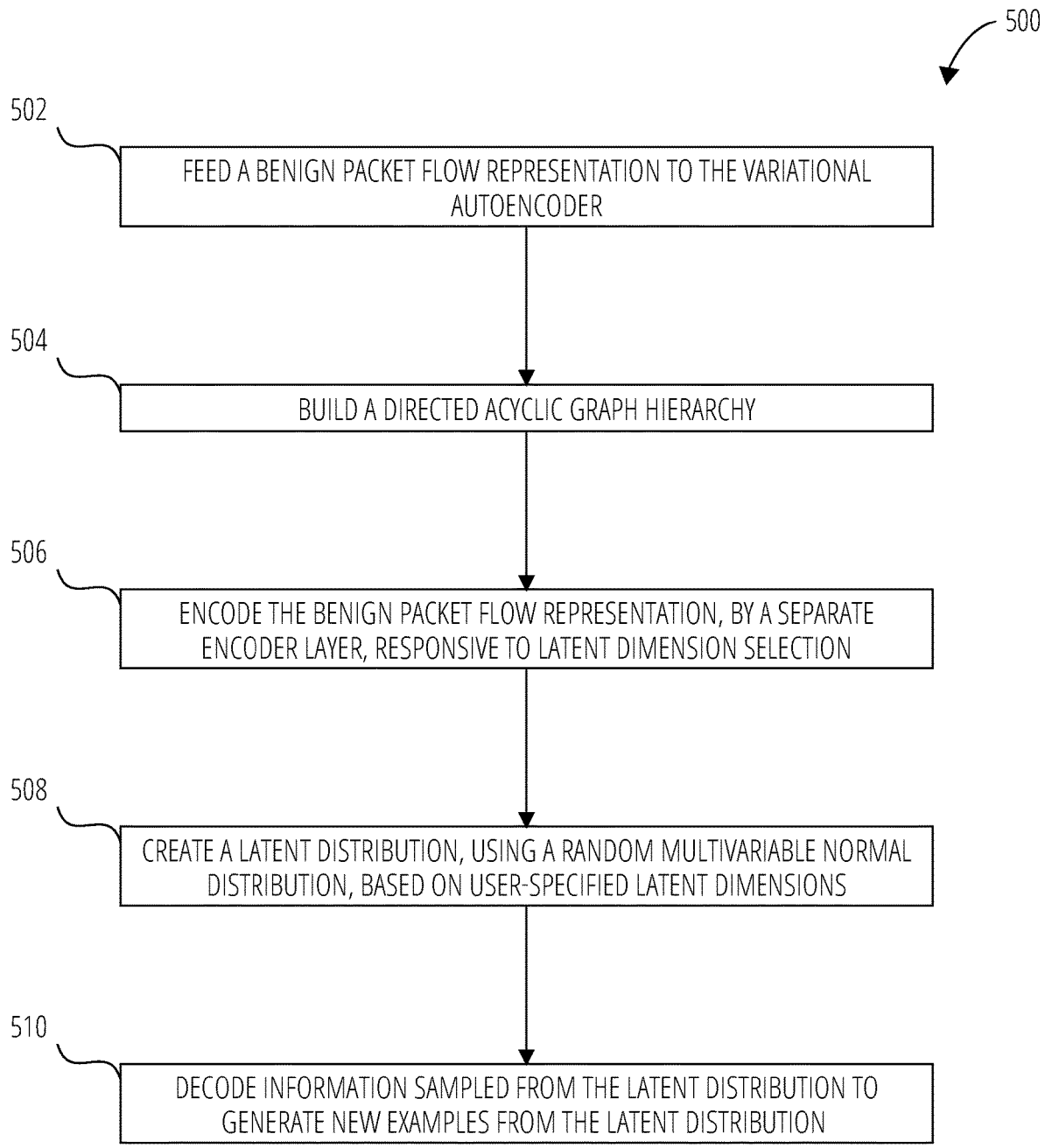
FIG. 5 is a flowchart illustrating a method of training a variational autoencoder, according to some embodiments.

FIG. 5 is a flowchart illustrating method 500 of training a variational autoencoder, according to some embodiments. At operation 502, method 500 includes feeding a benign packet flow representation to the variational autoencoder. At operation 504, method 500 includes building a directed acyclic graph hierarchy. At operation 506, method 500 includes encoding the benign packet flow representation, by a separate encoder layer, responsive to latent dimension selection. At operation 508, method 500 includes creating a latent distribution, using a random multivariable normal distribution, based on user-specified latent dimensions. At operation 510, method 500 includes decoding information sampled from the latent distribution to generate new examples from the latent distribution.

Figure 6:
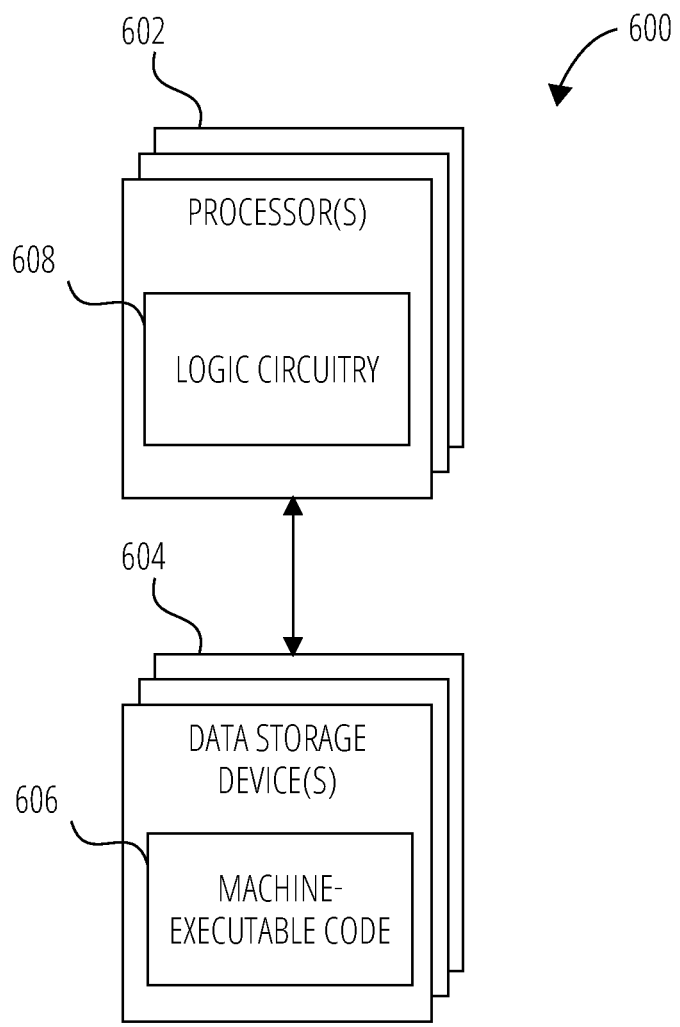
FIG. 6 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 6 illustrates non-limiting examples of implementations of functional elements disclosed herein. In some embodiments, some or all portions of the functional elements disclosed herein may be performed by hardware specially configured for carrying out the functional elements.

FIG. 6 is a block diagram of circuitry 600 that, in some embodiments, may be used to implement various functions, operations, acts, processes, and/or methods disclosed herein. The circuitry 600 includes one or more processors 602 (sometimes referred to herein as "processors 602") operably coupled to one or more data storage devices (sometimes referred to herein as "storage 604"). The storage 604 includes machine-executable code 606 stored thereon and the processors 602 include logic circuitry 608. The machine-executable code 606 includes information describing functional elements that may be implemented by (e.g., performed by) the logic circuitry 608. The logic circuitry 608 is adapted to implement (e.g., perform) the functional elements described by the machine-executable code 606. The circuitry 600, when executing the functional elements described by the machine-executable code 606, should be considered as special purpose hardware configured for carrying out functional elements disclosed herein. In some embodiments, the processors 602 may be configured to perform the functional elements described by the machine-executable code 606 sequentially, concurrently (e.g., on one or more different hardware platforms), or in one or more parallel process streams.

When implemented by logic circuitry 608 of the processors 602, the machine-executable code 606 is configured to adapt the processors 602 to perform operations of embodiments disclosed herein. For example, the machine-executable code 606 may be configured to adapt the processors 602 to perform at least a portion or a totality of the method 400 of FIG. 4 and/or the method 500 of FIG. 5. As another example, the machine-executable code 606 may be configured to adapt the processors 602 to perform at least a portion or a totality of the operations discussed for the processing circuitry 114 of FIG. 1, the decision 102 of FIG. 1, the processing circuitry 200 of FIG. 2, the packet flow representation generator 202 of FIG. 2, the variational autoencoder 204 of FIG. 2, the reconstruction loss calculator 210 of FIG. 2, the anomalous flow calculator 214 of FIG. 2, the variational autoencoder 300 of FIG. 3, the input layer 302 of FIG. 3, the encoder layer 304 of FIG. 3, the latent layer 306 of FIG. 3, the decoder layer 308 of FIG. 3, and/or the output layer 310 of FIG. 3.

The processors 602 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 606 (e.g., software code, firmware code, hardware descriptions) related to embodiments of the present disclosure. It is noted that a general-purpose processor (may also be referred to herein as a host processor or simply a host) may be a microprocessor, but in the alternative, the processors 602 may include any conventional processor, controller, microcontroller, or state machine. The processors 602 may also be implemented as a combination of computing devices, such as a combination of a DSP and a microprocessor, a plurality of microprocessors, one or more microprocessors in conjunction with a DSP core, or any other such configuration.

In some embodiments, the storage 604 includes volatile data storage (e.g., random-access memory (RAM)), non-volatile data storage (e.g., Flash memory, a hard disc drive, a solid-state drive, erasable programmable read-only memory (EPROM), etc.). In some embodiments, the processors 602 and the storage 604 may be implemented into a single device (e.g., a semiconductor device product, a system on chip (SOC), etc.). In some embodiments, the processors 602 and the storage 604 may be implemented into separate devices.

In some embodiments, the machine-executable code 606 may include computer-readable instructions (e.g., software code, firmware code). By way of non-limiting example, the computer-readable instructions may be stored by the storage 604, accessed directly by the processors 602, and executed by the processors 602 using at least the logic circuitry 608. Also, by way of non-limiting example, the computer-readable instructions may be stored on the storage 604, transferred to a memory device (not shown) for execution, and executed by the processors 602 using at least the logic circuitry 608. Accordingly, in some embodiments, the logic circuitry 608 includes electrically configurable logic circuitry 608.

In some embodiments, the machine-executable code 606 may describe hardware (e.g., circuitry) to be implemented in the logic circuitry 608 to perform the functional elements. This hardware may be described at any of a variety of levels of abstraction, from low-level transistor layouts to high-level description languages. At a high level of abstraction, a hardware description language (HDL) such as an IEEE Standard hardware description language (HDL) may be used. By way of non-limiting examples, VERILOG™, SYSTEMVERILOG™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 608 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments, the machine-executable code 606 may include an HDL, an RTL, a GL description, a mask level description, other hardware description, or any combination thereof.

In embodiments where the machine-executable code 606 includes a hardware description (at any level of abstraction), a system (not shown but including the storage 604) may be configured to implement the hardware description described by the machine-executable code 606. By way of non-limiting example, the processors 602 may include a programmable logic device (e.g., an FPGA or a PLC) and the logic circuitry 608 may be electrically controlled to implement circuitry corresponding to the hardware description into the logic circuitry 608. Also, by way of non-limiting example, the logic circuitry 608 may include hard-wired logic manufactured by a manufacturing system (not shown but including the storage 604) according to the hardware description of the machine-executable code 606.

Regardless of whether the machine-executable code 606 includes computer-readable instructions or a hardware description, the logic circuitry 608 is adapted to perform the functional elements described by the machine-executable code 606 when implementing the functional elements of the machine-executable code 606. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
   an input terminal configured to receive a stream of packets from a network; and
   processing circuitry implementing a variational autoencoder trained to reconstruct a benign packet flow representation of a benign packet flow corresponding to a benign stream of packets, the processing circuitry configured to:
      apply a packet flow representation of a packet flow corresponding to the received stream of packets to the variational autoencoder to generate a reconstructed packet flow representation, the packet flow representation comprising one or more of a determined transfer entropy corresponding to the received stream of packets or a Granger causality of the packet flow;
      determine a reconstruction loss of the reconstructed packet flow representation based, at least in part, on the determined transfer entropy corresponding to the received stream of packets or the determined Granger causality of the packet flow; and
      determine whether the received stream of packets is anomalous responsive to the determined reconstruction loss.

2. The apparatus of claim 1, wherein the variational autoencoder includes an input layer, an encoder layer, a latent layer, a decoder layer, and an output layer, the encoder layer configured to compress the packet flow representation into a latent space corresponding to the latent layer, the latent space corresponding to a random multivariable normal distribution, the decoder layer configured to generate the reconstructed packet flow representation responsive to information sampled from the latent space.

3. The apparatus of claim 1, wherein the processing circuitry is further configured to deliver the received stream of packets to a destination device responsive to a determination that the received stream of packets is not anomalous.

4. The apparatus of claim 1, wherein the processing circuitry is further configured to block the received stream of packets from a destination device for the received stream of packets responsive to a determination that the received stream of packets is anomalous.

5. The apparatus of claim 1, wherein the processing circuitry is configured to determine the packet flow representation responsive to the stream of packets itself.

6. The apparatus of claim 1, wherein the processing circuitry is configured to determine the packet flow representation responsive to summarized data indicating the packet flow.

7. A method of operating a security system, the method comprising:
  training a variational autoencoder to reconstruct a benign packet flow representation of a benign packet flow corresponding to a benign stream of packets;
  determining a packet flow representation of a packet flow corresponding to a received stream of packets, the packet flow representation comprising one or more of a determined transfer entropy corresponding to the received stream of packets or a Granger causality of the packet flow;
  applying the packet flow representation to the trained variational autoencoder to generate a reconstructed packet flow representation;
  determining a reconstruction loss of the reconstructed packet flow representation based, at least in part, on the determined transfer entropy corresponding to the received stream of packets or the determined Granger causality of the packet flow; and
  determining whether the received stream of packets is anomalous responsive to the reconstructed loss.

8. The method of claim 7, further comprising blocking the received stream of packets from delivery to a destination device responsive to a determination that the received stream of packets is anomalous.

9. The method of claim 7, further comprising delivering the received stream of packets to a destination device responsive to a determination that the received stream of packets is not anomalous.

10. The method of claim 7, wherein training the variational autoencoder comprises determining the benign packet flow representation of the benign packet flow responsive to the benign stream of packets itself.

11. The method of claim 7, wherein training the variational autoencoder comprises determining the benign packet flow representation responsive to summarized data indicating the benign packet flow.

12. The method of claim 7, wherein determining the packet flow representation comprises determining the packet flow representation of the packet flow responsive to the received stream of packets itself.

13. The method of claim 7, wherein determining the packet flow representation comprises determining the packet flow representation responsive to summarized data indicating the packet flow.

14. The method of claim 7, wherein training the variational autoencoder includes:
  feeding the benign packet flow representation to the variational autoencoder;
  building a directed acyclic graph hierarchy;
  encoding the benign packet flow representation, by a separate encoder layer, responsive to latent dimension selection;
  creating a latent distribution, using a random multivariable normal distribution, based on user-specified latent dimensions; and
  decoding information sampled from the latent distribution to generate new examples from the latent distribution.

15. A security system, comprising:
  a destination device;
  a network interface configured to receive a stream of packets from a network; and
  processing circuitry configured to:
    determine whether the received stream of packets is anomalous using a variational autoencoder trained to reconstruct a benign transfer entropy of a benign packet flow corresponding to a benign stream of packets; and
    deliver the received stream of packets to the destination device responsive to a determination that the received stream of packets is not anomalous, the determination based, at least in part, on the benign transfer entropy of a benign packet flow corresponding to a benign stream of packets.

16. The security system of claim 15, wherein the processing circuitry is further configured to block the received stream of packets from delivery to the destination device responsive to a determination that the received stream of packets is anomalous.

17. The security system of claim 15, wherein the processing circuitry is further configured to determine a transfer entropy of a packet flow corresponding to the received stream of packets.

18. The security system of claim 17, wherein the processing circuitry is configured to determine the transfer entropy responsive to the received stream of packets itself.

19. The security system of claim 17, wherein the processing circuitry is configured to determine the transfer entropy responsive to summarization information indicating the packet flow.

20. The security system of claim 17, wherein the processing circuitry is configured to determine whether the received stream of packets is anomalous by applying the determined transfer entropy to the variational autoencoder and determining a reconstruction loss of the reconstructed transfer entropy relative to the determined transfer entropy.

* * * * *